United States Patent [19]
van den Berg

[11] Patent Number: 5,988,106
[45] Date of Patent: Nov. 23, 1999

[54] METHOD AND APPARATUS OF CARING FOR ANIMALS, IN PARTICULAR FEEDING SAME

[75] Inventor: Karel van den Berg, Bleskensgraaf, Netherlands

[73] Assignee: Massland N.V. a Dutch limited liability company, Massland, Netherlands

[21] Appl. No.: 08/991,747

[22] Filed: Oct. 27, 1997

Related U.S. Application Data

[63] Continuation of application No. PCT/NL97/00081, Feb. 21, 1997.

[30] Foreign Application Priority Data

Feb. 28, 1996 [NL] Netherlands ............................ 1002471

[51] Int. Cl.⁶ ................................ A01K 1/00; A01K 1/12
[52] U.S. Cl. ...................... 119/51.02; 119/511; 119/842; 119/521; 119/14.18
[58] Field of Search .................................. 119/511, 51.02, 119/515, 521, 842, 520, 14.02, 14.08, 14.18

[56] References Cited

U.S. PATENT DOCUMENTS

| | | | |
|---|---|---|---|
| 3,929,277 | 12/1975 | Byrne et al. ............................. | 235/376 |
| 4,288,856 | 9/1981 | Linseth .................................... | 119/841 |
| 4,517,923 | 5/1985 | Palmer ................................... | 119/51.02 |
| 4,589,372 | 5/1986 | Smith ..................................... | 119/51.02 |
| 4,617,876 | 10/1986 | Hayes ..................................... | 119/842 |
| 4,624,215 | 11/1986 | Goldstein .............................. | 119/51.01 |
| 4,920,923 | 5/1990 | Hosoya ................................. | 119/51.02 |
| 5,579,719 | 12/1996 | Hoff et al. ............................. | 119/51.02 |
| 5,673,647 | 10/1997 | Pratt ...................................... | 119/51.02 |
| 5,769,023 | 6/1998 | Van Der Lely et al. .............. | 119/14.02 |

FOREIGN PATENT DOCUMENTS

| | | | |
|---|---|---|---|
| 3313532 | 10/1984 | Germany ............................. | 119/51.02 |

*Primary Examiner*—Michael J. Carone
*Assistant Examiner*—James S. Bergin
*Attorney, Agent, or Firm*—Penrose Lucas Albright

[57] ABSTRACT

A method and apparatus for treating animals that are milked in an automated milking system. For the animals involved or groups of such animals, there is stored a predetermined desired weight pattern for such animals or groups of animals, which weight pattern is based on the animal's actual weight pattern which extends over a relatively long period of time including, at least, each animal's last lactation period, into a computer memory. An animal is weighed in a milking compartment where it is simultaneously milked and fed two to four times in each twenty-four hour period. On the basis of the animal's ongoing weights, having in view its earlier established desired weight values, there is determined average actual weight values taking into account the weight variations due to contents of the animal's digestive tract and udder to provide expected variations around the average value. Thereafter, when the desired weight value stored in the computer memory applicable to the particular time insofar as the animal's life cycle is concerned is different than the actual average weight of the animal, considering variations, the quantity of feed to be distributed to the animal while it is being milked in the milking compartment is adjusted accordingly. If the actual weight of an animal is sufficiently different from the expected weight, the operator of the automated milking process is informed of such fact by signals provided to capture the operator's attention.

8 Claims, 2 Drawing Sheets

METHOD AND APPARATUS OF CARING FOR ANIMALS, IN PARTICULAR FEEDING SAME

RELATED APPLICATION

This is a continuation of International Application No. PCT/NL97/00081, filed Feb. 21, 1997.

FIELD OF THE INVENTION

The present invention relates to a method of treating animals.

BACKGROUND OF THE INVENTION

It is of importance that the animals maintain an optimal condition for the production of milk, i.e. that their musculature and extended fatness be such so as to retain them in an optimal healthy condition for producing milk. Part of the fat and the muscles is used at the beginning of the period of lactation because of energy deficiency. There is a so-called mobilization of physical reserves. After having calved, a cow normally looses forty to fifty kilograms of her weight, mainly in the form of fat. However, in extreme situations this loss may be much greater. In the course of the period of lactation these reserves are made up again and in particular by the time when the animal is set dry, the animal should have attained a condition that should be maintained until it has calved again. Taking into account the weight pattern shown in the course of time, in particular in the course of the lactation period, it is of importance that the treatment of the animal be such that its physical condition is optimal for producing milk.

SUMMARY OF THE INVENTION

In accordance with the invention, a method of treating animals is provided, in which method for the animals or groups of animals a predetermined weight pattern over a relatively long period of time which at least includes the animal's lactation period is stored in the memory of a computer. In said method, in consecutive steps, an animal is weighed one or more times per twenty-four hours, on the basis of the measured weight and earlier established weights there is determined an average value as well as a range weights taking into account the weight of a varying contents of the digestive tract and the udder around this average value, whereafter, when the time relevant weight value stored in the memory falls outside the actual weight range, the quantity of feed to be distributed to the animal will be adjusted. In other words, by storing a desired weight pattern over a relatively long period of time in the memory of a computer, it will be possible, by adjusting the quantity of feed to be distributed, to control the actual weight of an animal on the basis of weight desired. This desired predetermined weight pattern is established on the basis of the breed, type of carcass and the age of the animals. Although this weight pattern can be determined per animal, it is preferred to establish such a desired weight pattern for groups of animals and to record same in the memory. The period over which the feed control has to take place preferably comprises at least the period of lactation, because, at the beginning of the lactation period, the weight of the animals will have decreased considerably due to use of its physical reserves because of calving, whereas, when the weight of the animal is again reaching its previous level, it is necessary to provide that its weight does not increase too much. In the latter case there occurs a fatty degeneration due to which the state of health of the animals declines and the milk production decreases.

For example, it is possible to establish the weight of the animals two to four times per twenty-four hours, e.g. when the animals are milked. On the basis of the weights established there can be determined an average, e.g. each time over a period of e.g. three to eight days, while furthermore there can be determined a dispersion range around this average value, the dispersion range be selected so that almost all the weight values that are established will fall within the scope thereof, which means that varying contents of the digestive tract and the udder is taken into account. When the lower limit of this weight range is above the weight value stored in the memory being applicable for that moment, the quantity of feed to be distributed is decreased. When the upper limit of the weight range is below the weight value stored in the memory being applicable for that moment, the quantity of feed to be distributed to the animal is in principle increased. However, such an increase must not be put into effect in every case, because it may happen, of course, that in a number of consecutive times there has been established a weight lying below the lower limit of the weight range, in which case an attention signal is provided, because, of course, an animal may be ill. In other words, when in a very short span of time the weight of the animal has decreased to be relatively considerable extent, it should first ascertained whether the animal is ill and only when this appears not to be the case, should the quantity of feed to be distributed be increased. Also when in a number of consecutive times there has been established a weight lying below the average value, but above the lower limit of the weight range, an attention signal is provided. An animal may be in heat or ill or may have caught a latent disease. Whether it is advisable to provide an increased quantity of feed thus must be considered case by case.

Besides a method, the invention also relates to an implement or apparatus for treating animals, in which implement the above-described method can be applied. The implement is then characterized in that there is provided a computer, in the memory of which for the animals or groups of animals a predetermined weight pattern over a relatively long period of time is stored, as well as weighing means, whereby in the computer, on the basis of the measured weight of an animal and weight values established earlier, an average is determined, and a weight range is determined taking into account the weight of varying contents of the digestive tract and the udder around this average value, while there is additionally provided an automatic feeding installation for automatically supplying fodder to the animal, whereby when the weight value stored in the memory applicable for that moment falls outside the established weight range, the quantity of feed to be distributed to the animal will be adjusted. This implement can in particular be integrated in a system also comprising am apparatus for automatically milking animals, whereby fodder is distributed during milking. In particular, the implement can be included in a system also comprising a milking robot for automatically cleaning the teats of animal to be milked, automatically connecting teat cups to the teats of this animal, automatically milking this animal and automatically disconnecting the teat cups from the teats, whereby, distributed over the period of time required for milking, fodder is supplied. In such an automatic and robotized system, the animals visit the milking compartment on their own accord on average of approximately three times per twenty-four hours, while in said system it will be possible to carry out a weight measurement three to four times per twenty-four hours.

For a better understanding of the present invention and to show how the same may be carried into effect, reference will now be made, by way of example, to the accompanying drawings, in which:

DETAILED DESCRIPTION OF THE PREFERRED EMBODIMENTS

Figure 1:
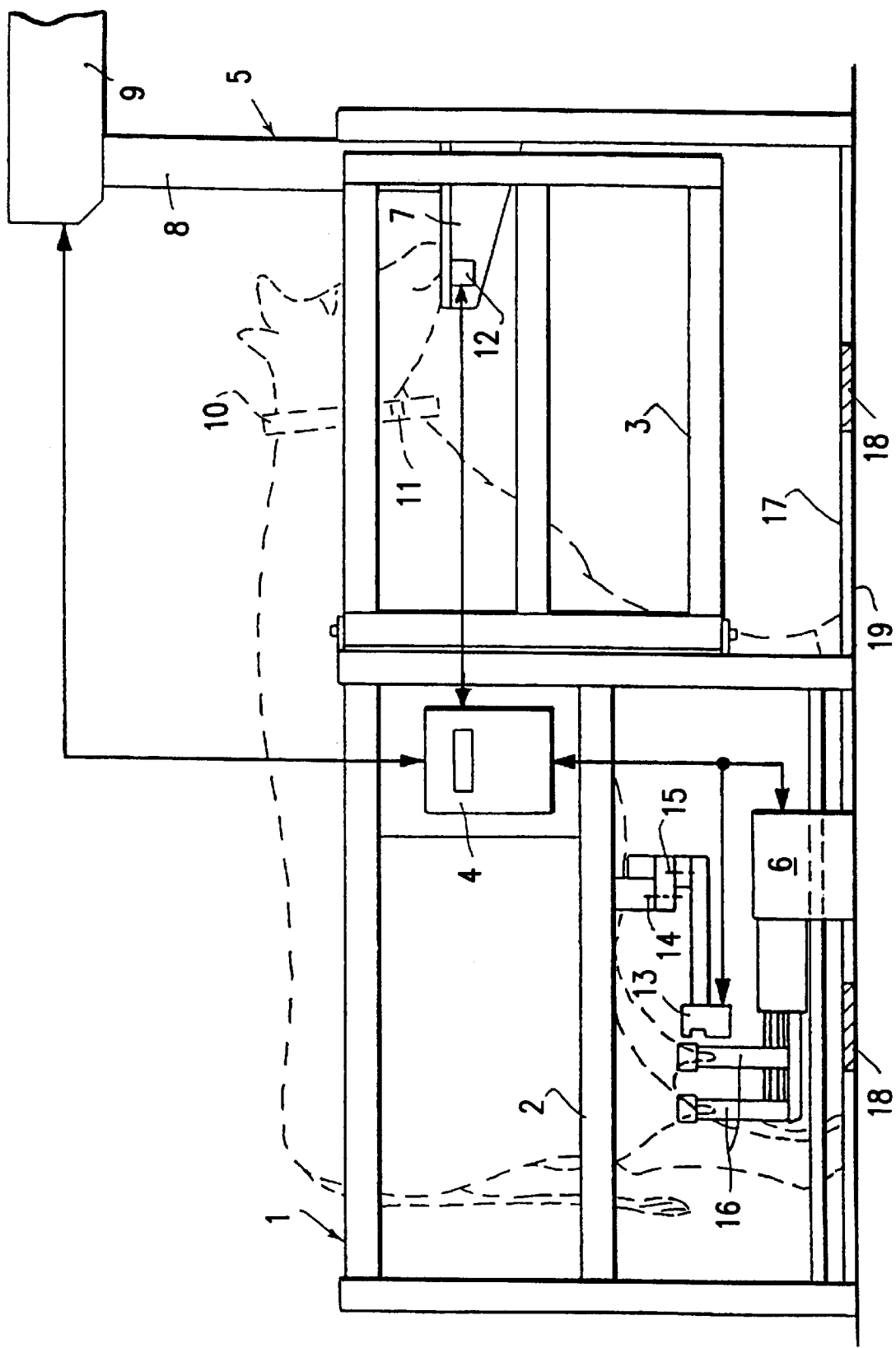
FIG. 1 shows schematically a side view of a milking compartment provided with an implement in accordance with the invention.

FIG. 1 shows a side view of a milking compartment, also known as a milk box composed of railings including an entrance door provided in the back wall of milking compartment 1 and, therefore, not shown in the figure, while there is additionally provided an exit door 3, shown in the figure in the longitudinal side of the milking compartment 1, at the front thereof. The apparatus furthermore comprises a computer 4, an automatic feeding installation 5 and a milking robot 6. The automatic feeding installation 5 includes a feeding trough 7 at the front wall of milking compartment 1, a feed supply 8 and a feed reservoir 9. In feed reservoir 9 the supply of feed to feeding trough 7 is controlled. For that purpose the automatic feeding installation 5 comprises a control system of which computer 4 constitutes part. In other words, by means of computer 4 and the further feed supply control means in feed reservoir 9, the supply of feed distributed to an animal in the milking compartment can be controlled. Animals which are allowed to enter milking compartment 1 are provided with collar 10, to which there is fitted a transponder 11. Said transponder 11 cooperates with a sensor 12 which is provided near feeding trough 7. Sensor 12 is connected to computer 4. Transponder 11 and sensor 12 constitute an animal identification system. When an animal has entered the milking compartment and has advanced sufficiently far to be able to reach with its head into feeding trough 7, then the distance between transponder 11 and sensor 12 is such that a communication between the two elements is possible so that the animal can be identified. Via this connection between sensor 12 and computer 4 the file in computer 4 regarding the relevant animal becomes accessible. From this file there can inter alia be obtained data indicating the position of the teats of the animal in milking compartment 1, so that detection means 13, which are located outside the milking box 1 in their operative position, can be pivoted by means of a pivoting movement about a pair of vertical shafts 14 and 15 under the udder of the animal into a defined position, in order to be able to determine the positions of the teats relative to milking compartment 1. After detection means 13, in cooperation with computer 4, have determined the position of the teats, milking robot 6 under the control of computer 4, is controlled so that teat cups 16 of said milking robot can be connected to the teats of the animal, whereafter the animal is automatically milked. Furthermore, the apparatus can be provided with means (not shown) for cleaning of the teats before the milking proper is started.

In the file in computer 4 there are updated, for each animal individually, all the relevant data regarding milking among which for example may be the milk yield per milking run, possibly even per udder quarter, and various data regarding the condition of health of the animal as well as regarding the quantity of feed distributed to the animal at each milking run and daily. By the computer it can also be determined how much feed has to be distributed at each milking run in order to obtain an optimal milk production. In other words, the feeding system has a control system comprising the computer and being such that, during the time when an animal is milked, there is automatically distributed to this animal a quantity of feed appropriate to the relevant animal. In order to keep the animal calm during the expected milking period, based on the milking times updated in the file of the relevant animal, so that the automatic connection of the teat cups and the consecutive milking can be effected without problems, the control system furthermore is such that the quantity of feed to be distributed to an animal is automatically supplied in such a manner that it is spread over the expected milking period. Although the distribution of feed can take place at the moment when the animal has entered the milking compartment, it may be of advantage to wait until the position of the teats is or has been determined and the teat cups are being connected, because before that time it may be of less importance that the animal being standing quietly in the milking compartment, whereas on the other hand there is a risk that the animal may prematurely commence the flowing milk due to fact that distribution of feed is capable of inciting the milking reflex.

When applying a computer-controlled feeding system the weight pattern of an animal in the course of time are to be taken into account. In FIGS. 2A, 2B, 2C and 2D this weight pattern, which can be established on the basis of, for example, the breed, the type of carcass and the age of the animals, is represented by the curve C. The lower case letters t and g refers to time and weight respectively. This desired weight pattern is determined and stored in the memory of computer 4. Although it is preferred to store this desired weight pattern over the whole year in the memory of the computer, storage of the desired weight pattern over the lactation period will suffice; thereafter, of course, the weight of an animal will remain rather stable at a constant supply of feed. In view of the feed control, the actual weight of the animal has to be updated by means of weighing means and to be compared with the weight desired. For that purpose the milking compartment is provided with a suspended floor 17, which, via pressure measuring elements 18, such as piezo elements, rests on a fixed floor 19. Each time when an animal enters milking compartment 1, the animal is weighed. By determining an average, in particular a progressive average, over these weight values, for example, each time over the last three to eight days, whereby two to four times per twenty-four hours the weight of the animals is measured, at a varying contents of the digestive tract, in particular the paunch, and the udder there will nevertheless be established a more or less continuous weight pattern. In the diagrams this average weight pattern is indicated by a curve k. In these diagrams there is indicated (in shaded lines) a dispersion range within which, with a healthy animal, most weight values measured or almost all the weight values measured will fall. In the diagrams this weight range is indicated by j.

Figure 2A:
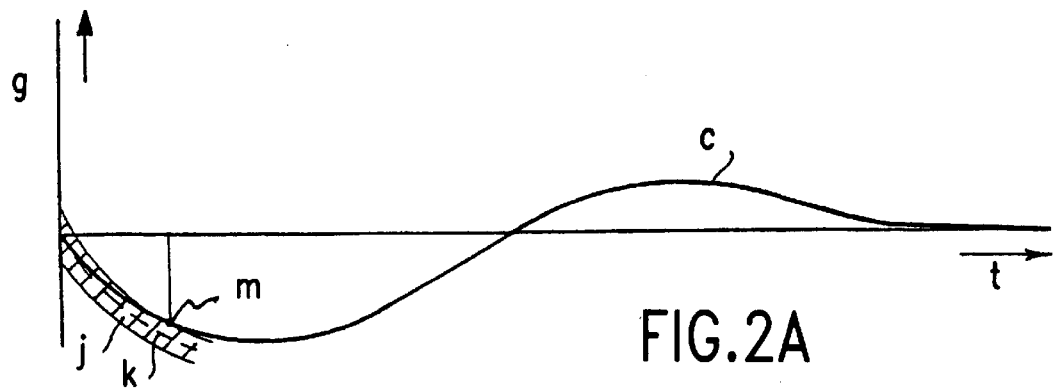
FIGS. 2A, 2B, 2C and 2D show a number of diagrams on the basis of which the method in accordance with the invention will be explained in further detail.
Figure 2B:
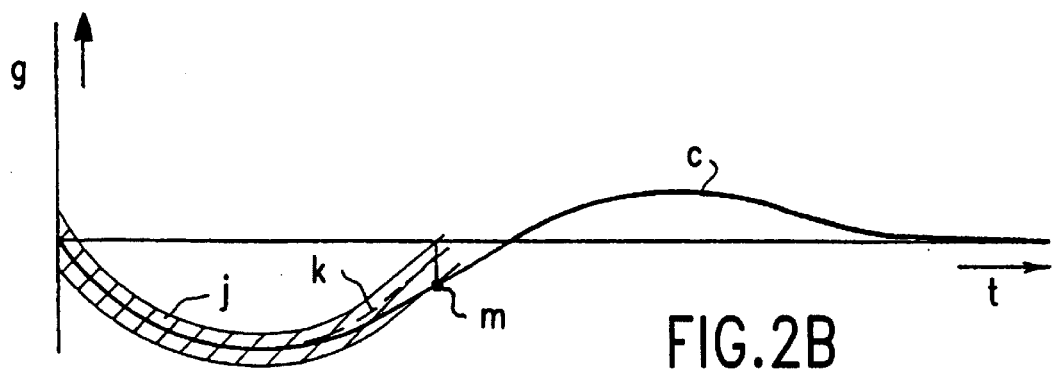

The pattern of curve C in the diagrams of FIGS. 2A, 2B, 2C and 2D is such that after calving, the weight of the animal decreases to a considerable extent, whereas in the course of the lactation period this weight will again reach its previous level and even have the tendency to increase to more than the weight achieved at calving, which is to be prevented. Therefore, curve C indicates the desired weight pattern goal to realize an optimal milk production. In FIG. 2A the situation is shown in which the actual weight k has gradually decreased below the weight desired at the particular time as indicated by point m. When the upper limit of the weight range j falls below the desired weight value for the moment, then action is taken whereby the quantity of feed to be distributed to the animal is increased, assuming at least that the particular circumstances as mentioned hereafter do not occur. FIG. 2B depicts the situation in which the actual weight k has gradually increased above the weight desired m. When the lower limit of weight range j has increased above weight value desired for the moment, then the quantity of feed to be distributed to the animal is decreased. Therefore, in the event of too large deviations of the average weight of an animal from the desired value therefor, a control signal provided by the computer 4 to the automatic feeding installation 5 adjusts the quantity of feed to be distributed to the animal.

Figure 2C:
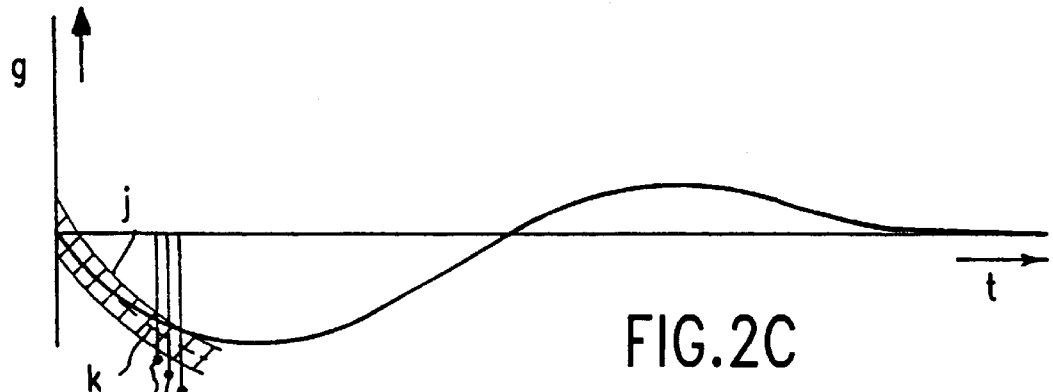
Figure 2D:
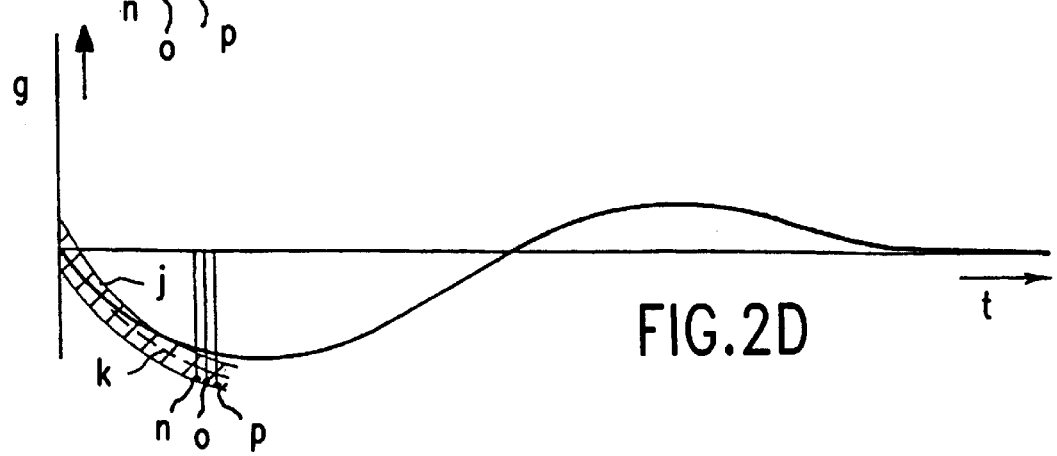

When an animal's weight suddenly decreases by reason of which the upper limit of the weight range j, falls below the weight value desired, then it is not advisable to increase immediately the supply of feed, because, of course, the animal may be ill. In FIG. 2C the situation is shown in which in a number of consecutive measurements, n, o and p, the animal's weight decreases until it is below the lower limit of weight range j. In that case computer 4, by means of a printer or by any other alarm means, provides an attention signal in order to indicate that the animal may be ill. In FIG. 2D the situation is shown wherever a number of consecutive measurements n, o and p, occur the animals weight is below the average value, but above the lower limit of the weight range j. In that case an attention signal also has to be supplied, because, of course, the animal may already be exhibiting disease symptoms or be in heat. The above-described attention signals can be combined in the computer with other signals indicating similar phenomena, such as signals supplied by a mastitis detector provided in the implement, or with signals supplied by an instrument indicating whether an animal is in heat. By means of a combination of these signals, mastitis or heat may be determined with a considerably greater degree of reliability.

Although I have disclosed the preferred embodiments of my invention, it is to be understood that it is capable of other adaptations and modifications within the scope of the following claims.

Having disclosed my invention, what I claim as new and to be secured by Letters Patent of the United States is:

1. A method of attending to animals in which method for the animals or groups of said animals, a predetermined weight pattern over a period of time which includes for each animal its lactation period, is collected and stored in the memory of a computer to provide a desired weight pattern goal, whereby, in consecutive steps, each animal of said animals or groups of animals is weighed in a milking compartment two to four times per twenty-four hours while being simultaneously automatically fed and automatically milked while being so fed, and on the basis of the animal's weight so measured there is determined an average actual weight pattern value as well as a weight range above and below said average actual weight pattern for the relevant animal taking into account the weight variations due to contents of the animal's digestive tract and the udder around this average actual weight pattern value, whereafter, when the time relevant desired weight pattern goal stored in the memory applicable for the relevant animal falls outside said weight range, the quantity of feed distributed to such relevant animal is adjusted.

2. A method in accordance with claim 1 wherein said desired weight pattern goal is determined on the basis of the animals' breed, the type of the animals' carcasses, and the age of each relevant animal.

3. A method in accordance with claim 1 wherein said period of time comprises at least for each relevant animal said relevant animal's period of lactation.

4. A method in accordance with claim 1 wherein when the lower limit of said relevant animal's weight range is more than its desired weight pattern goal stored in said memory for said relevant animal relevant to a particular moment in time, the quantity of feed distributed to said relevant animal is decreased.

5. A method in accordance with claim 1 wherein when a predetermined number of consecutive measurements of said animal's weight have been made and said relevant animal's actual weight pattern based thereon is consistently less than the desired weight pattern goal for said relevant animal, an attention signal is provided.

6. A method in accordance with claim 1 wherein when the upper limit of said weight range of said relevant animal is below the desired weight pattern goal for said relevant animal stored in said memory, the quantity of feed distributed to said relevant animal is increased.

7. A method in accordance with claim 1 wherein when after a predetermined number of consecutive measurements it is determined that said relevant animal's weight is consistently below said desired weight pattern goal while remaining above the lower limit of said weight range, an attention signal is provided that identifies said relevant animal.

8. A method of managing the weight of animals in a group of animals that are milked by an automated milking process and wherein the weight of said animals changes in a recurring manner relating in part to their respective lactation periods, the method comprising weighing said animals while they are being automatically milked about two to four times per day in a milking compartment, feeding said animals in said milking compartment while they are being milked therein, collecting data on the weights of each said animal so milked over a time span which includes the lactation period of each said animal and storing said data in the memory of a computer, recording for each said animal based on said data its actual average weight pattern over said time span, determining a short term weight variation range for each said animal which extends above and below said actual average weight pattern and is due to fluctuations in the contents of the animal's digestive system and udder, establishing a desired time relevant average weight pattern for each said animal for a further time span which generally corresponds in length to said first mentioned time span, and selectively increasing or decreasing the amount of feed consumed by each said animal in said milking compartment while being milked when the time related actual weight of said animal in said milking compartment is respectively below or above said desired time relevant average weight pattern including said weight variation range therefor.

* * * * *